United States Patent
Zhu et al.

(10) Patent No.: US 11,411,667 B2
(45) Date of Patent: Aug. 9, 2022

(54) CLOCK SOURCE DETERMINING METHOD AND APPARATUS

(71) Applicant: Huawei Technologies Co., Ltd., Shenzhen (CN)

(72) Inventors: Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 17/031,524

(22) Filed: Sep. 24, 2020

(65) Prior Publication Data

US 2021/0006345 A1     Jan. 7, 2021

Related U.S. Application Data

(63) Continuation of application No. PCT/CN2019/077878, filed on Mar. 12, 2019.

(30) Foreign Application Priority Data

Apr. 23, 2018 (CN) .......................... 201810367958.2

(51) Int. Cl.
   *H04J 3/06*            (2006.01)
   *H04W 56/00*     (2009.01)

(52) U.S. Cl.
   CPC .......... *H04J 3/0644* (2013.01); *H04J 3/0658* (2013.01); *H04W 56/00* (2013.01)

(58) Field of Classification Search
   CPC ...... H04J 3/0644; H04J 3/0658; H04W 56/00

(Continued)

(56) References Cited

U.S. PATENT DOCUMENTS 9,560,613 B1     1/2017    Srinivasan et al.
2011/0151772 A1   6/2011    Kim et al.
(Continued)

FOREIGN PATENT DOCUMENTS

CN     101771661 A     7/2010
CN     103297216 A     9/2013
(Continued)

OTHER PUBLICATIONS

China Mobile et al., "23.502: Service definition and applies to PDU Session Establishment", SA WG2 Meeting #118-BIS, S2-170593, Spokane, WA, US, Jan. 16-20, 2017, 10 pages.

(Continued)

*Primary Examiner* — Ricky Q Ngo
*Assistant Examiner* — Ellen A Kirillova
(74) *Attorney, Agent, or Firm* — Slater Matsil, LLP

(57) ABSTRACT

A clock source determining method and an apparatus are provided. The method includes: A session management network element receives a session request from a mobility management network element. The session request includes information about a network slice and a DNN, and the session request is used to request to create a session. The session management network element determines clock source information corresponding to both the information about the network slice and the DNN. The session management network element sends the clock source information to an access network device. The clock source information is used by the access network device to perform clock synchronization with a terminal device.

18 Claims, 8 Drawing Sheets

(58) Field of Classification Search
USPC .......................................................... 370/503
See application file for complete search history.

(56) References Cited

U.S. PATENT DOCUMENTS

| | | |
|---|---|---|
| 2017/0034507 A1 | 2/2017 | Harris et al. |
| 2018/0020477 A1* | 1/2018 | Neubacher ............... H04Q 9/00 |
| 2018/0103368 A1* | 4/2018 | Son ................... H04W 36/0011 |
| 2020/0336935 A1* | 10/2020 | Takakura .............. H04W 48/18 |

FOREIGN PATENT DOCUMENTS

| | | |
|---|---|---|
| CN | 104396151 A | 3/2015 |
| CN | 105893135 A | 8/2016 |
| CN | 106131947 A | 11/2016 |
| CN | 106301735 A | 1/2017 |

OTHER PUBLICATIONS

3GPP TS 23.501 V0.2.0 (Jan. 2017), 3rd Generation Partnership Project; Technical Specification Group Services and System Aspects; System Architecture for the 5G System; Stage 2 (Release 15), 69 pages.

Nokia et al., "23.501: clarification on Access type and RAT type", SA WG2 Meeting #122E e-meeting, S2-176738, Sep. 11-15, 2017, Elbonia, 10 pages.

\* cited by examiner

CLOCK SOURCE DETERMINING METHOD AND APPARATUS

CROSS-REFERENCE TO RELATED APPLICATIONS

This application is a continuation of International Application No. PCT/CN2019/077878, filed on Mar. 12, 2019, which claims priority to Chinese Patent Application No. 201810367958.2, filed on Apr. 23, 2018. The disclosures of the aforementioned applications are hereby incorporated by reference in their entireties.

TECHNICAL FIELD

This application relates to the field of communications technologies, and in particular, to a clock source determining method and an apparatus.

BACKGROUND

In time sensitive networking (TSN) and a mobile network, clock synchronization needs to be implemented between senders and receivers of many applications. For example, clock synchronization needs to be performed between an access network device and a terminal device in the mobile network, and a clock source needs to be used during the clock synchronization.

Generally, when there are a plurality of clock sources in the mobile network, how to select, from the plurality of clock sources, the clock source used for the clock synchronization between the access network device and the terminal device is a problem that needs to be resolved currently.

SUMMARY

This application provides a clock source determining method and apparatus, to select, for an access network device and a terminal device, a relatively appropriate clock source used for clock synchronization.

According to a first aspect, this application provides a clock source determining method. The method includes: A session management network element receives a session request from a mobility management network element. The session request includes information about a network slice and a data network name (DNN), and the session request is used to request to create a session. The session management network element determines clock source information corresponding to both the information about the network slice and the DNN. The session management network element sends the clock source information to an access network device. The clock source information is used by the access network device to perform clock synchronization with a terminal device. Based on this solution, in a session creation procedure, the session management network element may determine, based on the received information about the network slice and the received DNN, the clock source information corresponding to both the information about the network slice and the DNN, and send the clock source information to the access network device, and the access network device performs the clock synchronization with the terminal device based on the clock source, so that a clock source used for the clock synchronization can be selected for the access network device and the terminal device.

In a possible implementation, when the terminal device accesses a visited network, the session management network element is located in the visited network.

In a possible implementation, the session management network element may further receive, from a network management system, a correspondence among the information about the network slice, the DNN, and the clock source information; or the session management network element may further obtain, from a data management network element, a correspondence among the information about the network slice, the DNN, and the clock source information. Herein, two implementations in which the session management network element obtains the correspondence among the information about the network slice, the DNN, and the clock source information are provided. One implementation is that the information about the network slice and the DNN are configured by the network management system, and the other implementation is that the information about the network slice and the DNN may be obtained from the data management network element. The implementations are relatively flexible. Certainly, in addition to the two implementations, another manner may alternatively be selected in this embodiment of the present invention to obtain the correspondence among the information about the network slice, the DNN, and the clock source information.

According to a second aspect, this application provides a clock source determining method. The method includes the following. An access network device receives information about a network slice and a DNN, determines clock source information corresponding to both the information about the network slice and the DNN, and then performs clock synchronization with a terminal device based on the clock source information. In this solution, the access network device may determine, based on the received information about the network slice and the received DNN, the clock source information corresponding to both the information about the network slice and the DNN, and perform the clock synchronization with the terminal device based on the clock source, so that a clock source used for the clock synchronization can be selected for the access network device and the terminal device.

In a possible implementation, the access network device may receive the information about the network slice and the DNN from a session management network element. In another possible implementation, the access network device may further receive the information about the network slice and the DNN from a mobility management network element, where the information about the network slice is information about a network slice that is allowed to be accessed by the terminal device, and the DNN is a DNN supported by the network slice that is allowed to be accessed by the terminal device.

In a possible implementation, the access network device may further receive, from a network management system, a correspondence among the information about the network slice, the DNN, and the clock source information.

According to a third aspect, this application provides a clock source determining method. The method includes: A mobility management network element receives a request message from a terminal device. The request message is used to request to register with a network. The mobility management network element determines, based on subscription information of the terminal device, information about a network slice that is allowed to be accessed by the terminal device and a DNN supported by the network slice that is allowed to be accessed by the terminal device. The mobility management network element determines clock source information corresponding to both the information about the network slice that is allowed to be accessed by the terminal device and the DNN supported by the network slice that is allowed to be accessed by the terminal device. The mobility management network element sends the clock source information to an access network device. The clock source information is used by the access network device to perform clock synchronization with the terminal device. In this way, in a terminal registration procedure, the mobility management network element first determines the information about the network slice that is allowed to be accessed by the terminal device and the DNN supported by the network slice that is allowed to be accessed by the terminal device, and then determines the clock source information corresponding to both the information about the network slice that is allowed to be accessed by the terminal device and the DNN supported by the network slice that is allowed to be accessed by the terminal device. It should be noted that one or more pieces of clock source information may be determined herein. Then, the determined clock source information is sent to the access network device, and the access network device performs the clock synchronization with the terminal device based on the clock source, so that one or more clock sources used for the clock synchronization are selected for the access network device and the terminal device.

In a possible implementation, the mobility management network element may further obtain, from a data management network element, information about a network slice to which the terminal device subscribes and a DNN supported by the network slice to which the terminal device subscribes. The mobility management network element determines, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

In a possible implementation, the mobility management network element may receive, from a network management system, a correspondence among the information about the network slice that is allowed to be accessed by the terminal device, the DNN supported by the network slice that is allowed to be accessed by the terminal device, and the clock source information; or the mobility management network element may further obtain, from the data management network element, a correspondence among the information about the network slice that is allowed to be accessed by the terminal device, the DNN supported by the network slice that is allowed to be accessed by the terminal device, and the clock source information.

Herein, two implementations in which the session management network element obtains the correspondence among the information about the network slice that is allowed to be accessed by the terminal device, the DNN supported by the network slice that is allowed to be accessed by the terminal device, and the clock source information are provided. One implementation is that the correspondence is configured by the network management system, and the other implementation is that the correspondence is obtained from the data management network element. The implementations are relatively flexible.

According to a fourth aspect, this application provides a clock source determining method. The method includes the following. A mobility management network element receives a request message from a terminal device. The request message is used to request to register with a network. The mobility management network element determines, based on subscription information of the terminal device, information about a network slice that is allowed to be accessed by the terminal device and a DNN supported by the network slice that is allowed to be accessed by the terminal device. The mobility management network element sends, to an access network device, the information about the network slice that is allowed to be accessed by the terminal device and the DNN supported by the network slice that is allowed to be accessed by the terminal device. The information about the network slice that is allowed to be accessed by the terminal device and the DNN supported by the network slice that is allowed to be accessed by the terminal device are used to determine clock source information, and the clock source information is used by the access network device to perform clock synchronization with the terminal device. In this way, in a terminal registration procedure, the mobility management network element determines the information about the network slice that is allowed to be accessed by the terminal device and the DNN supported by the network slice that is allowed to be accessed by the terminal device. It should be noted that one or more DNNs may be determined herein. Then, the mobility management network element sends the determined DNN to the access network device, and the access network device determines the clock source information based on the received DNN. It should be noted that one or more pieces of clock source information may be determined herein. Then, the access network device performs the clock synchronization with the terminal device based on the clock source, so that one or more clock sources used for the clock synchronization are selected for the access network device and the terminal device.

In a possible implementation, that the mobility management network element determines, based on subscription information of the terminal device, information about a network slice that is allowed to be accessed by the terminal device and a DNN supported by the network slice that is allowed to be accessed by the terminal device may include: The mobility management network element obtains, from a data management network element, information about a network slice to which the terminal device subscribes and a DNN supported by the network slice to which the terminal device subscribes. The mobility management network element determines, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

According to a fifth aspect, this application provides a clock source determining method. The method includes: A mobility management network element receives a request message from a terminal device. The request message is used to request to create a session. The mobility management network element determines information about a network slice and a data network name DNN. The mobility management network element sends a session request to a session management network element. The session request includes the information about the network slice and the DNN, and the session request is used to request to create the session. The mobility management network element receives clock source information, from the session management network element, corresponding to both the information about the network slice and the DNN. The mobility management network element sends the clock source information to an access network device. The clock source information is used to trigger the access network device to perform clock synchronization with the terminal device.

In a possible implementation, that the mobility management network element determines information about a network slice and a DNN includes: The request message includes the information about the network slice and the DNN. The mobility management network element may directly obtain the information about the network slice and the DNN from the request message; or the mobility management network element may further determine the information about the network slice and the DNN based on subscription data of the terminal device. The subscription data of the terminal device includes information about a network slice to which the terminal device subscribes and a DNN supported by the network slice to which the terminal device subscribes.

According to a sixth aspect, this application provides an apparatus. The apparatus may be a session management network element, a mobility management network element, an access network device, or a chip. The apparatus has a function of implementing the embodiments of any one of the first aspect, the second aspect, the third aspect, the fourth aspect, or the fifth aspect. The function may be implemented by hardware, or may be implemented by hardware by executing corresponding software. The hardware or the software includes one or more modules corresponding to the function.

According to a seventh aspect, an apparatus is provided, including a processor and a memory. The memory is configured to store a computer-executable instruction. When the apparatus runs, the processor executes the computer-executable instruction stored in the memory, so that the apparatus is enabled to perform the clock source determining method according to any one of the first aspect or the possible implementations of the first aspect, or the apparatus is enabled to perform the clock source determining method according to any one of the second aspect or the possible implementations of the second aspect, or the apparatus is enabled to perform the clock source determining method according to any one of the third aspect or the possible implementations of the third aspect, or the apparatus is enabled to perform the clock source determining method according to any one of the fourth aspect or the possible implementations of the fourth aspect, or the apparatus is enabled to perform the clock source determining method according to any one of the fifth aspect or the possible implementations of the fifth aspect.

According to an eighth aspect, this application further provides a computer-readable storage medium. The computer-readable storage medium stores an instruction, and when the instruction is run on a computer, the computer is enabled to perform the methods according to the foregoing aspects.

According to a ninth aspect, this application further provides a computer program product including an instruction. When the computer program product runs on a computer, the computer is enabled to perform the methods according to the foregoing aspects.

According to a tenth aspect, this application further provides a system. The system includes the session management network element according to any one of the foregoing aspects and the mobility management network element according to any one of the foregoing aspects. Further, the system may further include the access network device according to any one of the foregoing aspects.

These aspects or other aspects of this application are more concise and understandable in the description of the following embodiments.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in method embodiments may also be applied to an apparatus embodiment or a system embodiment. In the description of this application, unless otherwise stated, "a plurality of" means two or more than two.

The network architecture and the service scenario described in embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1:
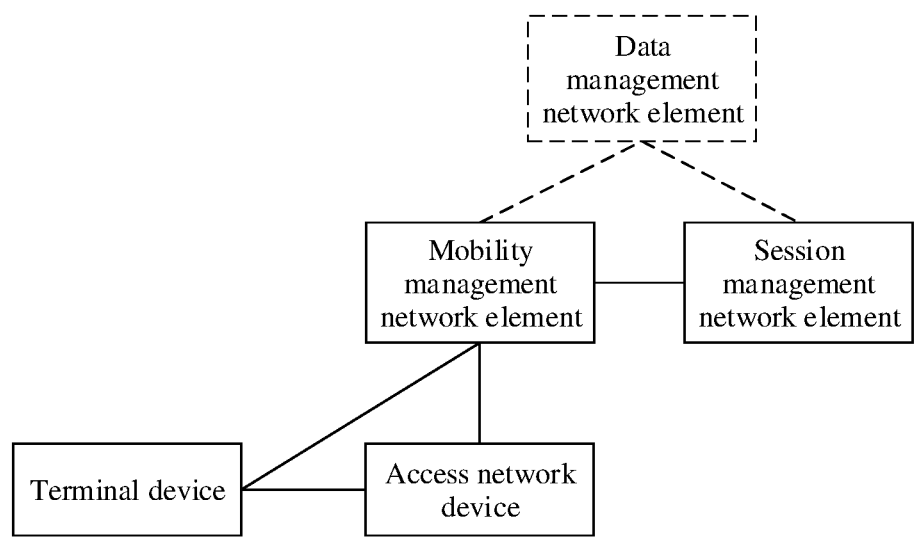
FIG. 1 is a schematic diagram of a possible network architecture according to this application.

FIG. 1 is a schematic diagram of a possible network architecture to which this application is applicable. The network architecture includes a terminal device, an access network device, a mobility management network element, and a session management network element. Optionally, the network architecture may further include a data management network element.

The terminal device is a device having a wireless transceiver function, and may be deployed on the land, including an indoor or outdoor device, a hand-held device, a wearable device, or a vehicle-mounted device; may be deployed on the water surface (for example, in a steamship); or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city (smart city), a wireless terminal in a smart home (smart home), or the like.

The mobility management network element is mainly used for mobility management, for example, user location update, registration of a user with a network, and user switching, in a mobile network. In 5th generation (5G) communication, the mobility management network element may be an access and mobility management function (AMF) network element. In future communication such as 6th generation (6G) communication, the mobility management network element may still be an AMF network element or have another name. This is not limited in this application.

The session management network element is mainly used for session management, for example, session establishment, modification, or release, in the mobile network. A specific function is, for example, allocating an internet protocol (IP) address to a user, or selecting a user plane network element that provides a packet forwarding function. In 5G, the session management network element may be a session management function (SMF) network element. In future communication such as 6G, the session management network element may still be an SMF network element or have another name. This is not limited in this application.

The access network device is a device that provides a wireless communication function for the terminal device. For example, the access network device includes but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, (HNB)), a baseband unit (BBU), a transmission reception point (TRP), a transmission point (TP), a mobile switching center, and the like.

The data management network element is mainly configured to store user data such as subscription information and authentication/authorization information. In 5G, the data management network element may be a unified data management (UDM) network element. In future communication such as 6G, the data management network element may still be a UDM network element or have another name. This is not limited in this application.

It may be understood that the foregoing functions may be network elements in a hardware device, or may be software functions running on dedicated hardware, or may be virtualization functions instantiated on a platform (for example, a cloud platform).

For ease of description, an example in which the mobility management network element is referred to as an AMF network element, the session management network element is referred to as an SMF network element, and the data management network element is referred to as a UDM network element is used for description below in this application. Further, the AMF network element is briefly referred to as an AMF, the SMF network element is briefly referred to as an SMF, and the UDM network element is briefly referred to as a UDM. To be specific, each AMF may be replaced with a mobility management network element, each SMF may be replaced with a session management network element, and each UDM may be replaced with a data management network element described below in this application.

The following specifically describes a clock source determining method provided in this application with reference to the accompanying drawings.

Figure 2:
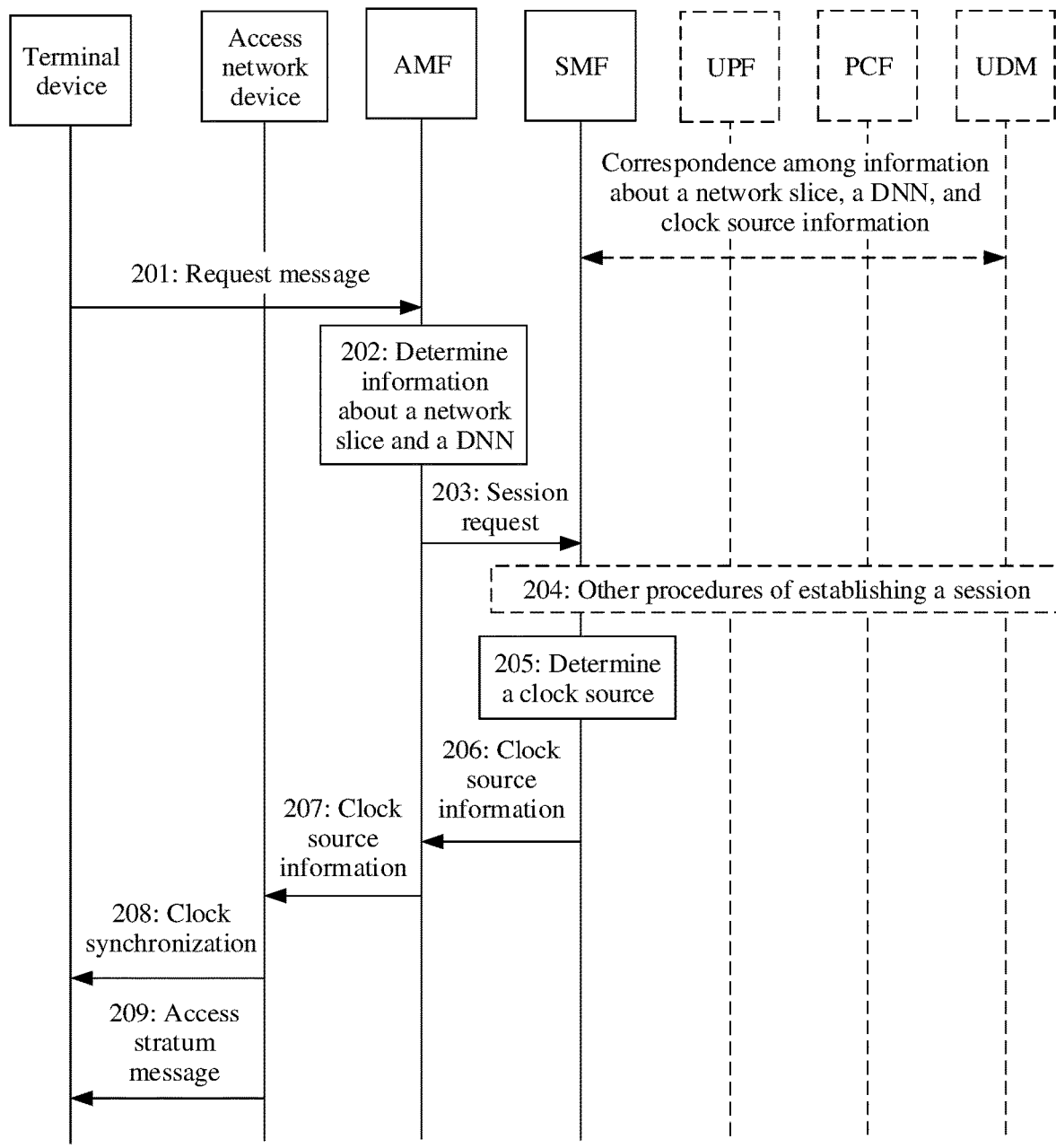
FIG. 2 is a flowchart of a clock source determining method according to this application.

FIG. 2 shows a clock source determining method according to this application. The method includes the following steps.

Step 201: A terminal device sends a request message to an AMF, and correspondingly, the AMF receives the request message.

The request message is used to request to create a session. The request message may also be referred to as a session establishment request message. In an implementation, the request message may be specifically a packet data unit (PDU) session establishment request message.

In an implementation, the request message may include information about a network slice and a DNN. In addition, the request message may further include a session identifier, for example, a PDU session identifier. The information about the network slice may be single network slice selection assistance information (S-NSSAI). In another implementation, the request message may alternatively not carry the information about the network slice and the DNN.

Step 202: The AMF determines the information about the network slice and the DNN.

In an implementation, if the request message in step 201 carries the information about the network slice and the DNN, the AMF may directly obtain the information about the network slice and the DNN from the request message.

In another implementation, if the request message in step 201 does not carry the information about the network slice and the DNN, the AMF may obtain subscription data (where the subscription information includes information about a network slice and a DNN that correspond to the terminal device) of the terminal device, and further determine the information about the network slice and the DNN based on the obtained subscription information of the terminal device. For example, the AMF may obtain subscription data of the terminal device in a registration procedure of the terminal device. The subscription data includes information such as information about network slices to which the terminal device subscribes and DNNs supported by the network slices to which the terminal device subscribes. Then, the AMF selects a network slice for the terminal device from the network slices to which the terminal device subscribes, and selects a DNN from the DNNs supported by the selected network slice. The following provides a description with reference to a specific example. Table 1 shows the information about the network slice to which the terminal device subscribes and the DNN. The S-NSSAI indicates the information about the network slice.

TABLE 1

| NSSAI to which the terminal device subscribes | Subscribed DNN |
| --- | --- |
| S-NSSAI-1 | DNN-1, DNN-1', and default DNN-A |
| S-NSSAI-2 | DNN-2, DNN-2', and default DNN-B |
| Default S-NSSAI-3 | DNN-3, DNN-3', and default DNN-C |

As shown in Table 1, the NSSAI to which the terminal device subscribes includes S-NSSAI-1, S-NSSAI-2, and S-NSSAI-3, and the S-NSSAI-3 is default (default) S-NSAI. In addition, the S-NSSAI-1 supports a DNN-1, a DNN-1', and a DNN-A, and the DNN-A is a DNN supported by default in the S-NSSAI-1. The S-NSSAI-2 supports a DNN-2, a DNN-2', and a DNN-B, and the DNN-B is a DNN supported by default in the S-NSSAI-2. The S-NSSAI-3 supports a DNN-3, a DNN-3', and a DNN-C, and the DNN-C is a DNN supported by default in the S-NSSAI-3.

Therefore, information about the network slice that is selected by the AMF for the terminal device based on the NSSAI to which the terminal device subscribes may be the S-NSSAI-3. In other words, the default S-NSSAI is selected. In addition, the DNN selected for the terminal device is the DNN-C. In other words, the DNN supported by default is selected from the DNNs supported by the S-NSSAI-3.

Certainly, the foregoing is merely an example. In actual application, there may further be another selection manner. For example, a network slice may be randomly selected from information about a plurality of network slices supported by the terminal device, or a network slice is selected based on load (for example, a network slice with lowest load is selected). Further, a DNN selection manner may be that a DNN is randomly selected from DNNs supported by the selected network slice, or a DNN is selected based on load (for example, a DNN with lowest load is selected).

Then, the AMF selects, based on the information about the determined network slice and the DNN, an SMF that can support the information about the network slice and the DNN.

It should be noted that when the terminal device accesses a visited network, the selected SMF is located in the visited network. For example, when the terminal device initiates, in a visited public land mobile network (vPLMN), a request message used to request to establish a session, the request message sent by the terminal device in step 201 includes the session identifier, h-S-NSSAI, v-S-NSSAI, and the DNN. The h-S-NSSAI is valid S-NSSAI of a home public land mobile network (home public land mobile network, hPLMN), and the v-S-NSSAI is valid S-NSSAI of the VPLMN.

Further, if determining, based on the DNN, that the session may be home routed (HR), the AMF selects a V-SMF and an H-SMF based on parameters carried in the request message of the terminal device, for example, the h-S-NSSAI, the v-S-NSSAI, and the DNN, the V-SMF supports the v-S-NSSAI and the DNN that are carried in the request message of the terminal device, and the H-SMF supports the h-S-NSSAI and the DNN that are carried in the request message of the terminal device. In addition, the AMF subsequently sends a session request to the V-SMF.

If determining, based on the DNN, that local breakout (LBO) may be performed on the session, the AMF selects a V-SMF based on parameters carried in the request message of the terminal device, for example, the v-S-NSSAI and the DNN, and the V-SMF supports the v-S-NSSAI and the DNN that are carried in the request message of the terminal device.

Step 203: The AMF sends a session request to the SMF, and the SMF may receive the session request. The session request includes the information about the determined network slice and the determined DNN, and the session request may be used to request to create a session.

In an implementation, a specific implementation in which the AMF sends the session request to the SMF may be sending a session request message, where the session request message carries the information about the determined network slice and the determined DNN. In addition, the session request message may further include a permanent identifier of the terminal device, the session identifier, and the like.

In another implementation, a specific implementation in which the AMF sends the session request to the SMF may alternatively be invoking a service, for example, invoking an Nsmf_PDUSession_CreateSMContext Request service of the SMF, to send the information about the network slice and the DNN to the SMF. In addition, the AMF may further send the permanent identifier of the terminal device, the session identifier, and the like to the SMF.

After the SMF receives the session request, the SMF is triggered to establish a session context for the terminal device.

It should be noted that, if the session may be home routed (HR), and the SMF is the V-SMF, the session request includes the v-S-NSSAI, the h-S-NSSAI, an H-SMF ID, and the DNN. Further, the session request may further include the permanent identifier of the terminal device, the session identifier, and the like. The V-SMF subsequently sends, based on the H-SMF ID, a session establishment request to an H-SMF identified by the H-SMF ID, to trigger the H-SMF to create a session context for UE in the HPLMN.

It should be noted that, if local breakout (LBO) may be performed on the session, and the SMF is the V-SMF, the session request includes the v-S-NSSAI and the DNN. Further, the session request may further include the permanent identifier of the terminal device, the session identifier, and the like.

Step 204: Perform other procedures of establishing the session, where step 204 may be an optional step. For example, the other procedures of establishing the session include: The SMF sends an identifier of the SMF to a UDM for registration, and the SMF obtains session-related subscription data from the UDM. For example, the session-related subscription data may include quality of service (QoS) information to which the terminal device subscribes and a session aggregate maximum bit rate (Session-AMBR) to which the terminal device subscribes for each session. The SMF obtains policy information from a policy control function (PCF) network element, and the SMF selects a user plane function (UPF) network element for the terminal device, allocates an IP address to the terminal device, and the like. Details are not described herein.

Step 205: The SMF determines a clock source based on the information about the network slice and the DNN that are sent by the AMF. The SMF may prestore information about a correspondence among the information about the network slice, the DNN, and the clock source. The correspondence may be preconfigured by a network management system for the SMF. To be specific, the SMF receives, from the network management system, the correspondence among the information about the network slice, the DNN, and the clock source. In another implementation, the correspondence may alternatively be obtained by the SMF from the UDM. For example, the SMF sends a request to the UDM, so that the UDM returns the correspondence among the information about the network slice, the DNN, and the clock source to the SMF.

Table 2 shows the correspondence among the information about the network slice, the DNN, and the clock source stored in the SMF. S-NSSAI-1 is S-NSSAI to which the SMF belongs. DNNs supported by the S-NSSAI-3 include a DNN-3, a DNN-3', and a DNN-C. Clock source information corresponding to the DNN-3 is clock source information 1, and clock source information corresponding to the DNN-3' is clock source information 2, and clock source information corresponding to the DNN-C is clock source information 3.

TABLE 2

| S-NSSAI-3 | |
|---|---|
| DNN-3 | Clock source information 1 (clock ID-1) |
| DNN-3' | Clock source information 2 (clock ID-2) |
| DNN-C | Clock source information 3 (clock ID-3) |

In an implementation, the clock source information may be an identifier of a clock source. To be specific, the identifier of the clock source is used to uniquely identify the clock source. For example, the clock source information 1 may be a clock ID-1, the clock source information 2 may be a clock ID-2, and the clock source information 3 may be a clock ID-3. For example, the clock source information 1 may be an identifier of a level-1 reference clock, the clock source information 2 may be an identifier of a level-2 reference clock, and the clock source information 3 may be an identifier of a level-3 reference clock.

The level-1 reference clock may be a primary reference clock (PRC) or a local primary reference clock (LPR). A PRC-level clock usually uses a caesium clock or a hydrogen clock to provide a high-precision clock source. An LPR-level clock usually uses a rubidium clock and a global positioning system (GPS) satellite synchronization mode to provide a high-precision clock source. The level-2 reference clock may be a synchronization supply unit (SSU). The level-2 clock is equipped with a digital phase locked loop that is based on the rubidium clock, providing excellent tracing, filtering, and maintenance features. The level-3 reference clock may be a synchronous digital hierarchy equipment clock (SEC). The level-3 reference clock is equipped with a digital phase locked loop that is based on a high-stability crystal oscillator. A maintenance feature of the level-3 reference clock is poorer than that of the level-2 reference clock.

In step 205, the SMF may determine the clock source information based on the received information about the network slice and the received DNN.

For example, if the request message in step 201 carries the information about the network slice and the DNN, for example, the information about the network slice and the DNN that are carried are respectively the S-NSSAI-3 and the DNN-3', the AMF sends the S-NSSAI-3 and the DNN-3' to the SMF, so that the SMF receives the S-NSSAI-3 and the DNN-3', and then the clock source information determined by the SMF based on the correspondence shown in Table 2 is the clock ID-2.

For another example, if the request message in step 201 does not carry the information about the network slice and the DNN, the AMF determines the information about the network slice and the DNN, for example, the information about the determined network slice and the determined DNN are respectively the S-NSSAI-3 and the DNN-C, and then the AMF sends the S-NSSAI-3 and the DNN-C to the SMF, so that the SMF receives the S-NSSAI-3 and the DNN-C, and then the clock source information determined by the SMF based on the correspondence shown in Table 2 is the clock ID-3.

Step 206: The SMF sends the clock source information to the AMF, and then the AMF may receive the clock source information.

In an implementation, the SMF may send the clock source information to the AMF through service invoking. For example, the SMF invokes an Namf_Communication_N1N2MessageTransfer service of the AMF, and input of the service invoking includes an N2 SM container (the session identifier, the S-NSSAI, and the clock source information) sent to an access network device and an N1 SM container (a session establishment accept message (the S-NSSAI and the DNN)) sent to the terminal device. The N2 SM container (the session identifier, the S-NSSAI, and the clock source information) indicates that the N2 SM container includes the session identifier, the S-NSSAI, and the clock source information. The N1 SM container (the session establishment accept message (the S-NSSAI and the DNN)) indicates that the N1 SM container includes the session establishment accept message, and the session establishment accept message includes the S-NSSAI and the DNN. This is not described in the following.

The clock source information sent to the AMF may be specifically an identifier of the clock source information, for example, the clock ID-2 determined in step 204.

Step 207: The AMF sends the clock source information to the access network device, and then the access network device may receive the clock source information.

In an implementation, if the SMF sends the clock source information to the AMF through the service invoking, the AMF receives the N2 SM container (the session identifier, the S-NSSAI, and the clock source information) that needs to be sent to the access network device and the N1 SM container (the session establishment accept message (the S-NSSAI and the DNN)) that needs to be sent to the terminal device. In this case, in step 207, the AMF may send a session request message to the access network device, for example, send an N2 PDU session request message. The session request message includes the N2 SM container (the session identifier, the S-NSSAI, and the clock source information) and a non-access stratum (non access stratum, NAS) message, and the NAS message includes the session identifier and the N1 SM container (the session establishment accept message (the S-NSSAI and the DNN)).

According to the foregoing method, in a session creation procedure, the SMF determines, based on the received information about the network slice and the received DNN, the clock source information corresponding to both the information about the network slice and the DNN, and sends the clock source information to the access network device, and the access network device performs clock synchronization with the terminal device based on the clock source, so that a more appropriate clock source used for the clock synchronization is selected for the access network device and the terminal device.

Further, the method may further include the following step 208 and step 209.

Step 208: The access network device performs the clock synchronization with the terminal device based on the clock source information.

In other words, the clock source is used by the access network device to perform the clock synchronization with the terminal device.

In an implementation, the access network device may implement the clock synchronization with the terminal device through broadcast. For example, the access network device implements the synchronization by broadcasting the clock source information by using a system information block (SIB), and participation of a core network may not be required. Further, to avoid a problem of a pseudo access network device, a certificate of an operator to which the access network device belongs may be configured for the terminal device, to authenticate the access network device.

In another implementation, the access network device may alternatively implement the clock synchronization with the terminal device through broadcast, and perform security encryption on the clock source information based on the broadcast. To be specific, the access network device encrypts SIB information by using an area key, and the terminal device obtains the key corresponding to the SIB through interaction with the core network, and then decrypts the SIB to implement the synchronization.

In still another implementation, the access network device may alternatively implement the clock synchronization with the terminal device through unicast. The access network device synchronizes the clock source information with the terminal device by using a unicast access stratum (AS)

message and based on a terminal device granularity or a slice granularity and an indication of the core network. The AS message may be encrypted by using an AS stratum key.

Step 209: The access network device sends the AS message to the terminal device, and then the terminal device receives the AS message.

The AS message includes the N1 SM container (the session establishment accept message (the S-NSSAI and the DNN)).

The session establishment accept message may be used to indicate that session establishment is completed.

It should be noted that there is no strict execution sequence between step 208 and step 209. To be specific, step 208 may be performed before step 209, or step 209 may be performed before step 208.

Therefore, the present invention discloses a clock source determining method, including:

A session management network element receives a session request from a mobility management network element, where the session request includes information about a network slice and a data network name DNN, and the session request is used to request to create a session (refer to the description of step 203).

The session management network element determines clock source information corresponding to both the information about the network slice and the DNN (refer to the description of step 205).

The session management network element sends the clock source information to an access network device, where the clock source information is used by the access network device to perform clock synchronization with a terminal device (refer to the descriptions of steps 206 and 207).

In a possible implementation, when the terminal device accesses a visited network, the session management network element is located in the visited network.

In a possible implementation, the method further includes: The session management network element receives, from a network management system, a correspondence among the information about the network slice, the DNN, and the clock source information; or the session management network element obtains, from a data management network element, a correspondence among the information about the network slice, the DNN, and the clock source information.

In the foregoing clock source determining method, in a session creation procedure, the session management network element determines, based on the received information about the network slice and the received DNN, the clock source information corresponding to both the information about the network slice and the DNN, and sends the clock source information to the access network device, and the access network device performs the clock synchronization with the terminal device based on the clock source, so that a clock source used for the clock synchronization is selected for the access network device and the terminal device.

The present invention further discloses a clock source determining method, including:

A mobility management network element receives a request message from a terminal device, where the request message is used to request to create a session (refer to the description of step 201).

The mobility management network element determines information about a network slice and a data network name DNN (refer to the description of step 202).

The mobility management network element sends a session request to a session management network element, where the session request includes the information about the network slice and the DNN, and the session request is used to request to create the session (refer to the description of step 203).

The mobility management network element receives clock source information, from the session management network element, corresponding to both the information about the network slice and the DNN (refer to the description of step 206).

The mobility management network element sends the clock source information to an access network device, where the clock source information is used to trigger the access network device to perform clock synchronization with the terminal device (refer to the description of step 207).

In a possible implementation, that the mobility management network element determines information about a network slice and a DNN includes: The request message includes the information about the network slice and the DNN. The mobility management network element obtains the information about the network slice and the DNN from the request message; or the mobility management network element determines the information about the network slice and the DNN based on subscription data of the terminal device. The subscription data of the terminal device includes information about a network slice to which the terminal device subscribes and a DNN supported by the network slice to which the terminal device subscribes.

Figure 3:
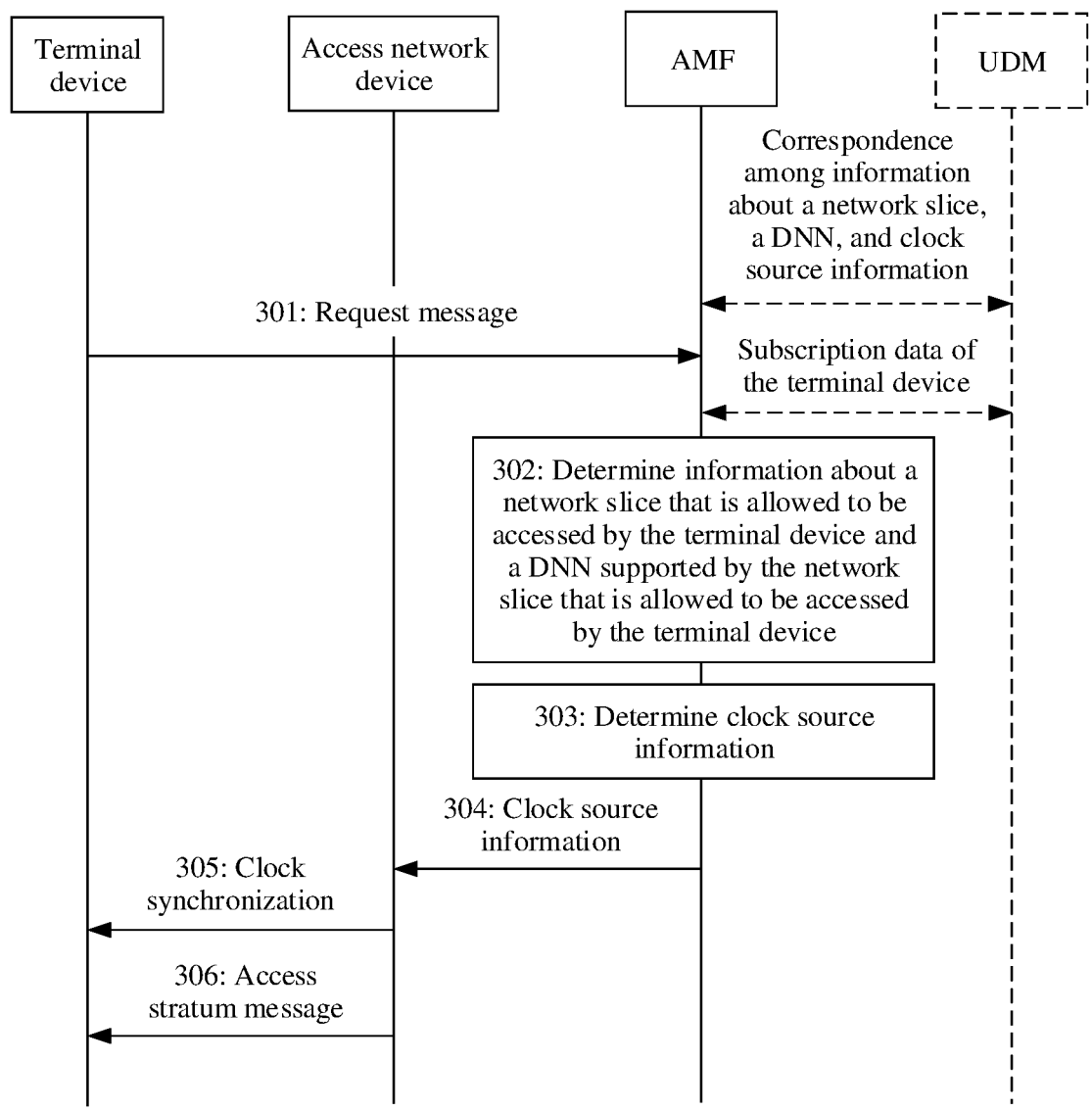
FIG. 3 is a flowchart of another clock source determining method according to this application.

The following describes another clock source determining method. As shown in FIG. 3, the method includes the following steps.

Step 301: A terminal device sends a request message to an AMF, and then the AMF receives the request message. The request message may be used to request to register with a network. The request message may also be referred to as a registration request message.

The request message may include requested information about a network slice. For example, the information about the network slice in the request message may be requested network slice selection assistance information (requested network slice selection assistance information, requested NSSAI). To be specific, the request message includes the requested NSSAI, and the requested NSSAI includes one or more pieces of S-NSSAI.

It should be noted that, in the example in FIG. 3, the request message in step 301 does not include a DNN.

Step 302: The AMF determines, based on subscription information of the terminal device, information about a network slice that is allowed to be accessed by the terminal device and a DNN supported by the network slice that is allowed to be accessed by the terminal device.

The AMF obtains the subscription information of the terminal device from a UDM, and the subscription information of the terminal device includes information about a network slice to which the terminal device subscribes and a DNN supported by the network slice to which the terminal device subscribes. The AMF determines, based on the requested NSSAI and the subscription information of the terminal device, the information about the network slice that is allowed to be accessed. For example, the information about the network slice that is allowed to be accessed may be indicated by using allowed NSSAI. S-NSSAI included in the determined allowed NSSAI may be an intersection set of the S-NSSAI included in the requested NSSAI and S-NSSAI included in the NSSAI to which the terminal device subscribes. Further, the AMF determines a DNN supported by the S-NSSAI in the allowed NSSAI.

Step 303: The AMF determines clock source information corresponding to both the information about the network slice that is allowed to be accessed by the terminal device and the DNN supported by the network slice that is allowed to be accessed by the terminal device.

Herein, the AMF prestores a correspondence among the information about the network slice, the DNN, and the clock source. The correspondence may be configured by a network management system. To be specific, the AMF receives, from the network management system, the correspondence among the information about the network slice, the DNN, and the clock source. Alternatively, the correspondence may be obtained by the AMF from the UDM. For example, the AMF sends a request to the UDM, so that the UDM returns the correspondence among the information about the network slice, the DNN, and the clock source to the AMF. The following provides a description with reference to a specific example.

Table 3 shows the correspondence among the information about the network slice, the DNN, and the clock source stored in the AMF. S-NSSAI-1, S-NSSAI-2, and S-NSSAI-3 are S-NSSAI supported by the AMF. DNNs supported by the S-NSSAI-1 include a DNN-1 and a DNN-1', DNNs supported by the S-NSSAI-2 include a DNN-2 and a DNN-2', and DNNs supported by the S-NSSAI-3 include a DNN-3 and a DNN-3'. In addition, clock source information corresponding to the DNN-1 is clock source information 1, and clock source information corresponding to the DNN-1' is clock source information 1'. Clock source information corresponding to the DNN-2 is clock source information 2, and clock source information corresponding to the DNN-2' is clock source information 2'. Clock source information corresponding to the DNN-3 is clock source information 3, and clock source information corresponding to the DNN-3' is clock source information 3'.

TABLE 3

| S-NSSAI-1 | |
|---|---|
| DNN-1 | Clock source information 1 (clock ID-1) |
| DNN-1' | Clock source information 1' (clock ID-1') |
| S-NSSAI-2 | |
| DNN-2 | Clock source information 2 (clock ID-2) |
| DNN-2' | Clock source information 2' (clock ID-2') |
| S-NSSAI-3 | |
| DNN-3 | Clock source information 3 (clock ID-3) |
| DNN-3' | Clock source information 3' (clock ID-3') |

It is assumed that the allowed NSSAI of the terminal device and the DNN supported by the allowed NSSAI that are determined in step 302 are shown in Table 4.

TABLE 4

| Allowed NSSAI | DNN supported by allowed NSSAI |
|---|---|
| S-NSSAI-1 | DNN-1 and DNN-1' |
| S-NSSAI-2 | DNN-2 and DNN-2' |

According to Table 4, the allowed NSSAI of the terminal device includes the S-NSSAI-1 and the S-NSSAI-2, DNNs supported by the S-NSSAI-1 include the DNN-1 and the DNN-1', and DNNs supported by the S-NSSAI-2 include the DNN-2 and the DNN-2'.

In this case, the clock source information determined by the AMF according to Table 4 and Table 3 is shown in Table 5.

TABLE 5

| Allowed NSSAI | DNN supported by allowed NSSAI | Clock source information |
|---|---|---|
| S-NSSAI-1 | DNN-1 | Clock source information 1 (clock ID-1) |
| | DNN-1' | Clock source information 1' (clock ID-1') |
| S-NSSAI-2 | DNN-2 | Clock source information 2 (clock ID-2) |
| | DNN-2' | Clock source information 2' (clock ID-2') |

To be specific, the clock source information determined by the AMF includes the clock source information 1, the clock source information 1', the clock source information 2, and the clock source information 2'.

Step 304: The AMF sends the clock source information to an access network device, and then the access network device receives the clock source information.

The clock source information is used by the access network device to perform clock synchronization with the terminal device.

Using Table 5 as an example, the clock source information sent by the AMF to the access network device includes the clock source information 1, the clock source information 1', the clock source information 2, and the clock source information 2'.

In an implementation, the AMF may send a registration accept message to the access network device, and the registration accept message is used to notify the terminal device that registration is completed. The registration accept message carries an N2 message sent to the access network device and a NAS message sent to the terminal device, and the N2 message carries the clock source information determined by the AMF.

According to the foregoing method, in a registration procedure of the terminal device, the AMF first determines the information about the network slice that is allowed to be accessed by the terminal device and the DNN supported by the network slice that is allowed to be accessed by the terminal device, and then determines the clock source information corresponding to both the information about the network slice that is allowed to be accessed by the terminal device and the DNN supported by the network slice that is allowed to be accessed by the terminal device. It should be noted that one or more pieces of clock source information may be determined herein. Then, the determined clock source information is sent to the access network device, and the access network device performs the clock synchronization with the terminal device based on the clock source, so that one or more clock sources used for the clock synchronization are selected for the access network device and the terminal device.

In an implementation, the AMF may send the information shown in the foregoing Table 5 to the access network device, and the information includes the allowed NSSAI, the DNN supported by the allowed NSSAI, and the clock source information. Therefore, when receiving the clock source information, the access network device may further determine a correspondence among a clock source, S-NSSAI in the allowed NSSAI, and a DNN supported by the S-NSSAI in the allowed NSSAI. To be specific, the access network device may determine S-NSSAI and a DNN that correspond to each clock source.

Further, the method may further include the following step 305 and step 306.

Step 305: The access network device performs the clock synchronization with the terminal device based on the clock source information.

Herein, for a method for performing the clock synchronization between the access network device and the terminal device, refer to related descriptions of the foregoing step 208. Details are not described herein again.

It should be noted that the access network device may receive one or more pieces of clock source information. If more than one piece of clock source information is received, the access network device needs to separately perform clock synchronization once with the terminal device based on each piece of clock source information, and a quantity of times of clock synchronization is equal to a quantity of pieces of clock source information returned by the AMF.

Step 306: The access network device sends an AS message to the terminal device, and correspondingly, the terminal device receives the AS message.

The AS message includes the NAS message. The NAS message carries a temporary identifier allocated by the AMF to the terminal device.

It should be noted that there is no strict execution sequence between step 305 and step 306. To be specific, step 305 may be performed before step 306, or step 306 may be performed before step 305.

Therefore, the present invention further discloses a clock source determining method, including:

A mobility management network element receives a request message from a terminal device, where the request message is used to request to register with a network (refer to the description of step 301).

The mobility management network element determines, based on subscription information of the terminal device, information about a network slice that is allowed to be accessed by the terminal device and a data network name DNN supported by the network slice that is allowed to be accessed by the terminal device (refer to the description of step 302).

The mobility management network element determines clock source information corresponding to both the information about the network slice that is allowed to be accessed by the terminal device and the DNN supported by the network slice that is allowed to be accessed by the terminal device (refer to the description of step 303).

The mobility management network element sends the clock source information to an access network device, where the clock source information is used by the access network device to perform clock synchronization with the terminal device (refer to the description of step 304).

In a possible implementation, that the mobility management network element determines, based on subscription information of the terminal device, information about a network slice that is allowed to be accessed by the terminal device and a DNN supported by the network slice that is allowed to be accessed by the terminal device includes: The mobility management network element obtains, from a data management network element, information about a network slice to which the terminal device subscribes and a DNN supported by the network slice to which the terminal device subscribes. The mobility management network element determines, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

In a possible implementation, the method further includes: The mobility management network element receives, from a network management system, a correspondence among the information about the network slice that is allowed to be accessed by the terminal device, the DNN supported by the network slice that is allowed to be accessed by the terminal device, and the clock source information; or the mobility management network element obtains, from the data management network element, a correspondence among the information about the network slice that is allowed to be accessed by the terminal device, the DNN supported by the network slice that is allowed to be accessed by the terminal device, and the clock source information.

In the foregoing clock source determining method, in a terminal registration procedure, the mobility management network element first determines the information about the network slice that is allowed to be accessed by the terminal device and the DNN supported by the network slice that is allowed to be accessed by the terminal device, and then determines the clock source information corresponding to both the information about the network slice that is allowed to be accessed by the terminal device and the DNN supported by the network slice that is allowed to be accessed by the terminal device. It should be noted that one or more pieces of clock source information may be determined herein. Then, the determined clock source information is sent to the access network device, and the access network device performs the clock synchronization with the terminal device based on the clock source, so that one or more clock sources used for the clock synchronization are selected for the access network device and the terminal device.

Figure 4:
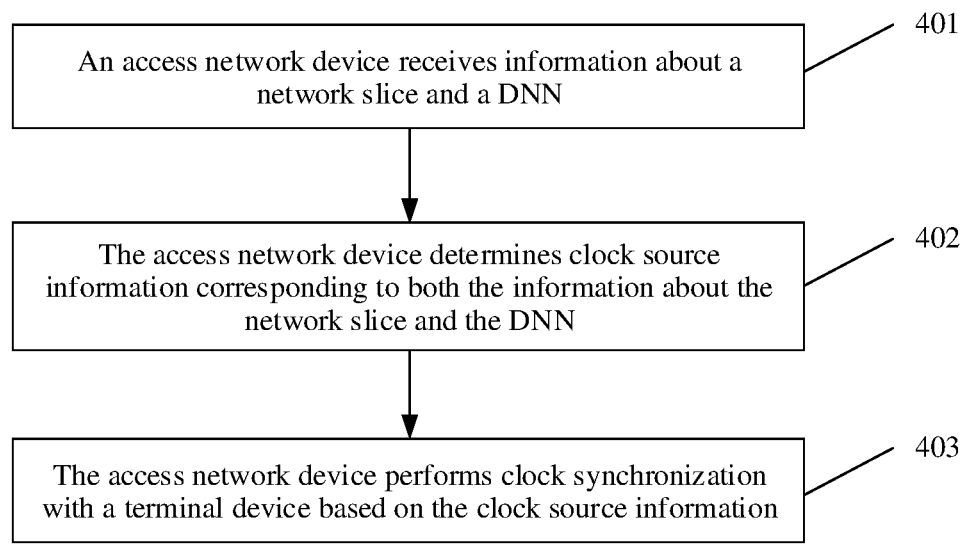
FIG. 4 is a flowchart of still another clock source determining method according to this application.

The following describes still another clock source determining method. As shown in FIG. 4, the method may include the following steps.

Step 401: An access network device receives information about a network slice and a DNN.

In an implementation, the access network device may receive the information about the network slice and the DNN from an SMF in a session establishment procedure. This is further described with reference to FIG. 5.

In another implementation, the access network device may receive the information about the network slice and the DNN from an AMF in a registration procedure of a terminal device. In addition, the information about the network slice received by the access network device from the AMF is information about a network slice that is allowed to be accessed by the terminal device, and the received DNN is a DNN supported by the network slice that is allowed to be accessed by the terminal device. This is further described with reference to FIG. 6.

Step 402: The access network device determines clock source information corresponding to both the information about the network slice and the DNN.

Herein, the access network device may prestore a correspondence among the information about the network slice, the DNN, and a clock source. The correspondence may be configured by a network management system. To be specific, the access network device receives, from the network management system, the correspondence among the information about the network slice, the DNN, and the clock source. The correspondence among the information about the network slice, the DNN, and the clock source stored in the access network device may be shown in the foregoing Table 3. Therefore, in step 402, the access network device may determine, based on the foregoing Table 3, the clock source information corresponding to both the received information about the network slice and the received DNN. For example, if the access network device receives (S-NSSAI-2 and a DNN-2), the determined clock source information is clock source information 2.

For another example, if ((S-NSSAI-2 and a DNN-2) and (S-NSSAI-3 and a DNN-3)) are received, the determined clock source information includes clock source information 2 and clock source information 3.

Step 403: The access network device performs the clock synchronization with the terminal device based on the clock source information. Herein, for a method for performing the clock synchronization between the access network device and the terminal device, refer to related descriptions of the foregoing step 208. Details are not described herein again.

It should be noted that the access network device may determine one or more pieces of clock source information. If more than one piece of clock source information is determined, the access network device needs to separately perform clock synchronization once with the terminal device based on each piece of clock source information, and a quantity of times of clock synchronization is equal to a quantity of pieces of clock source information determined by the access network device.

According to the foregoing method, the access network device determines, based on the received information about the network slice and the received DNN, the clock source information corresponding to both the information about the network slice and the DNN, and performs the clock synchronization with the terminal device based on the clock source, so that an appropriate clock source used for the clock synchronization is selected for the access network device and the terminal device.

Figure 5:
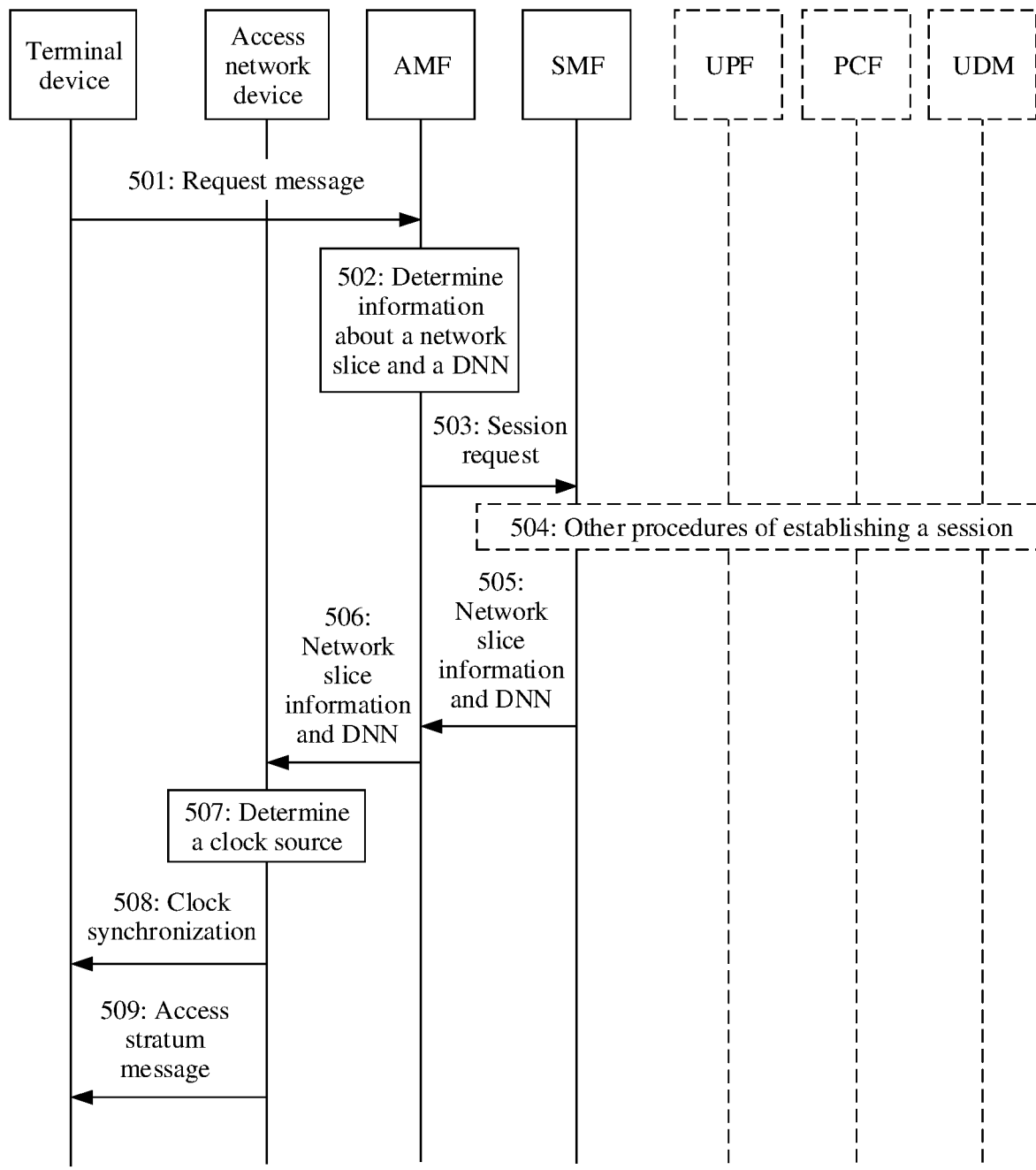
FIG. 5 is a flowchart of yet another clock source determining method according to this application.
Figure 6:
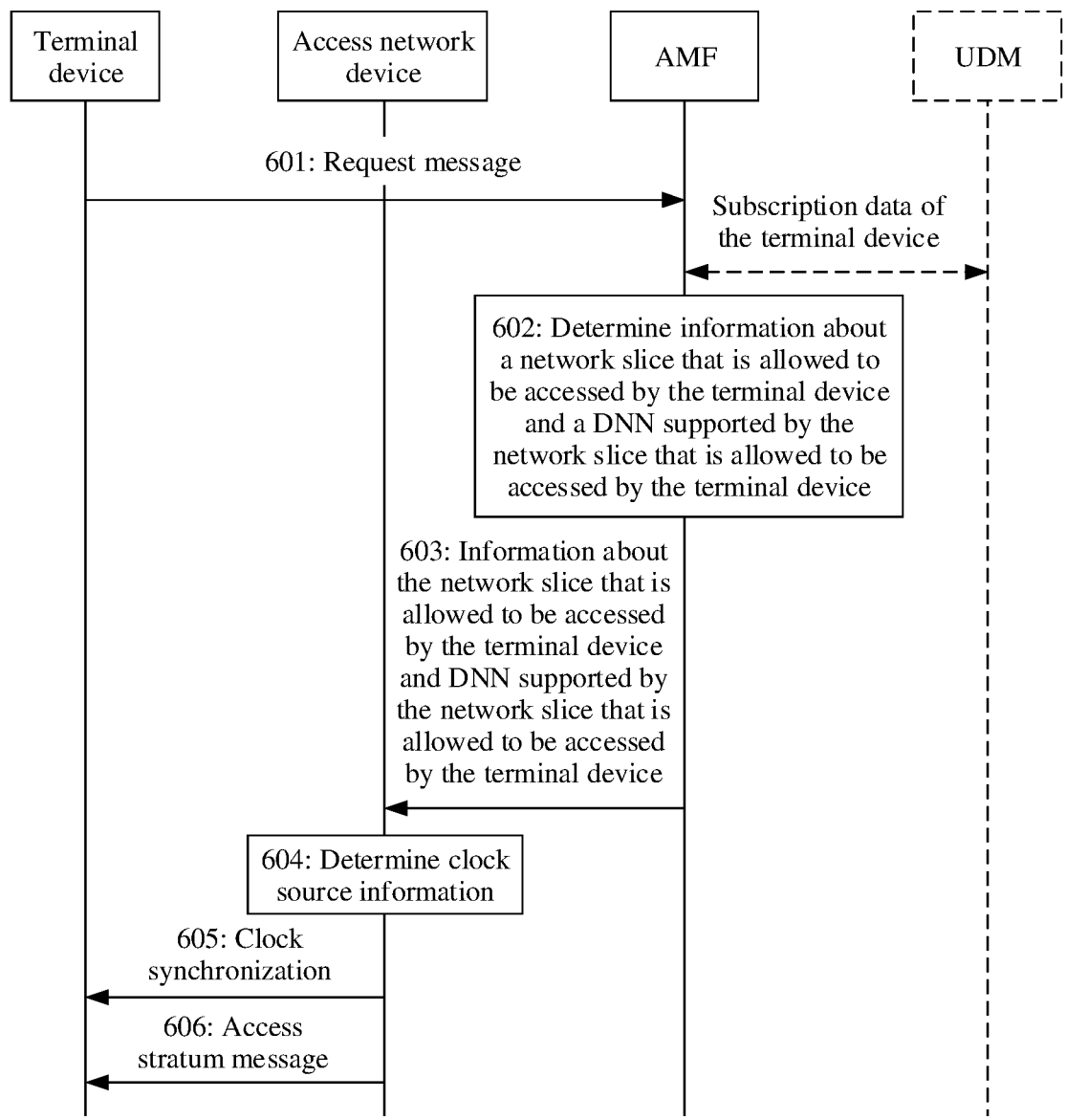
FIG. 6 is a flowchart of still yet another clock source determining method according to this application.

The following provides two specific implementation processes of the embodiment shown in FIG. 4 with reference to the accompanying drawings. FIG. 5 shows a clock source determining method in a session establishment procedure of a terminal device. FIG. 6 shows a clock source determining method in a registration procedure of a terminal device.

Specifically, the procedure shown in FIG. 5 may include the following steps.

Step 501 to step 504 are the same as step 201 to step 204 in the embodiment shown in FIG. 2. Refer to the foregoing descriptions.

An SMF may obtain, by using step 501 to step 504, information about a network slice and a DNN supported by the information about the network slice.

Step 505: The SMF sends the information about the network slice and the DNN supported by the information about the network slice to an AMF, and then the AMF receives the information about the network slice and the DNN supported by the information about the network slice.

In an implementation, the SMF may send the information about the network slice and the DNN supported by the information about the network slice to the AMF through service invoking. For example, the SMF invokes an Namf_Communication_N1N2MessageTransfer service of the AMF, and input of the service invoking includes an N2 SM container (a session identifier, S-NSSAI, and a DNN) sent to an access network device and an N1 SM container (a session establishment accept message (S-NSSAI and a DNN)) sent to a terminal device.

Step 506: The AMF sends, to the access network device, the information about the network slice and the DNN supported by the information about the network slice. Correspondingly, the access network device receives the information about the network slice and the DNN supported by the information about the network slice.

In an implementation, if the SMF may send clock source information to the AMF through service invoking, the AMF receives an N2 SM container (a session identifier, S-NSSAI, and a DNN) that needs to be sent to the access network device and an N1 SM container (a session establishment accept message (S-NSSAI and a DNN)) that needs to be sent to the terminal device. In this case, in step 506, the AMF may send a session request message to the access network device, for example, send an N2 PDU session request message. The session request message includes the N2 SM container (the session identifier, the S-NSSAI, and the DNN) and a NAS message. The NAS message includes the session identifier and the N1 SM container (the session establishment accept message (the S-NSSAI and the DNN)).

Step 507: The access network device determines the clock source information. For a specific clock source determining method of the access network, refer to related descriptions of step 402 in the embodiment shown in FIG. 4. Details are not described herein again. It should be noted that, in the session establishment procedure shown in FIG. 5, the access network device receives one piece of information about the network slice and one DNN. Therefore, the access network device also determines one piece of clock source information.

According to the foregoing method, the access network device determines, based on the received information about the network slice and the received DNN, the clock source information corresponding to both the information about the network slice and the DNN, and performs the clock synchronization with the terminal device based on the clock source, so that a more appropriate clock source used for the clock synchronization is selected for the access network device and the terminal device.

Further, the method further includes the following step 508 and step 509.

Step 508: The access network device performs the clock synchronization with the terminal device based on the clock source information.

In other words, the clock source is used by the access network device to perform the clock synchronization with the terminal device.

Herein, for a method for performing the clock synchronization between the access network device and the terminal device, refer to related descriptions of the foregoing step 208. Details are not described herein again.

Step 509: The access network device sends an AS message to the terminal device, and correspondingly, the terminal device receives the AS message.

The AS message includes the N1 SM container (the session establishment accept message (the S-NSSAI and the DNN)).

The session establishment accept message is used to indicate that session establishment is completed.

It should be noted that there is no strict execution sequence between step 508 and step 509. To be specific, step 508 may be performed before step 509, or step 509 may be performed before step 508.

Specifically, the procedure shown in FIG. 6 may include the following steps.

Step 601 to step 602 are the same as step 301 to step 302 in the embodiment shown in FIG. 3. Refer to the foregoing descriptions.

Step 603: An AMF sends, to an access network device, information about a network slice that is allowed to be accessed by a terminal device and a DNN supported by the network slice that is allowed to be accessed by the terminal device.

In an implementation, the AMF sends a registration accept message to the access network device, and the registration accept message is used to notify the terminal device that registration is completed. The registration accept message carries an N2 message sent to the access network device and a NAS message sent to the terminal device, and the N2 message carries the information about the network slice that is allowed to be accessed by the terminal device and the DNN supported by the network slice that is allowed to be accessed by the terminal device that are determined by the AMF.

Step 604: The access network device determines clock source information. For a specific clock source determining method of the access network, refer to related descriptions of step 402 in the embodiment shown in FIG. 4. Details are not described herein again.

It should be noted that in the registration procedure shown in FIG. 6, the access network device may receive one or more pieces of information about the network slice that is allowed to be accessed by the terminal device, and may receive one or more DNNs supported by the network slice that is allowed to be accessed by the terminal device. Therefore, the access network device may determine one or more pieces of clock source information.

According to the foregoing method, the access network device determines, based on the received information about the network slice and the received DNN, the clock source information corresponding to both the information about the network slice and the DNN, and performs clock synchronization with the terminal device based on the clock source, so that a clock source used for the clock synchronization is selected for the access network device and the terminal device.

Step 605: The access network device performs the clock synchronization with the terminal device based on the clock source information.

Herein, for a method for performing the clock synchronization between the access network device and the terminal device, refer to related descriptions of the foregoing step 208. Details are not described herein again.

It should be noted that the access network device may determine one or more pieces of clock source information. If more than one piece of clock source information is determined, the access network device needs to separately perform clock synchronization once with the terminal device based on each piece of clock source information, and a quantity of times of clock synchronization is equal to a quantity of pieces of clock source information determined by the access network device.

Further, the method further includes the following step 606.

Step 606: The access network device sends an AS message to the terminal device, and correspondingly, the terminal device receives the AS message.

The AS message includes the NAS message. The NAS message carries a temporary identifier allocated by the AMF to the terminal device.

It should be noted that there is no strict execution sequence between step 605 and step 606. To be specific, step 605 may be performed before step 606, or step 606 may be performed before step 605.

Therefore, the present invention further discloses a clock source determining method, including:

A mobility management network element receives a request message from a terminal device, where the request message is used to request to register with a network (refer to step 601).

The mobility management network element determines, based on subscription information of the terminal device, information about a network slice that is allowed to be accessed by the terminal device and a data network name DNN supported by the network slice that is allowed to be accessed by the terminal device (refer to step 602).

The mobility management network element sends, to an access network device, the information about the network slice that is allowed to be accessed by the terminal device and the DNN supported by the network slice that is allowed to be accessed by the terminal device (refer to the description of step 603).

The information about the network slice that is allowed to be accessed by the terminal device and the DNN supported by the network slice that is allowed to be accessed by the terminal device are used to determine clock source information, and the clock source information is used by the access network device to perform clock synchronization with the terminal device.

In a possible implementation, that the mobility management network element determines, based on subscription information of the terminal device, information about a network slice that is allowed to be accessed by the terminal device and a DNN supported by the network slice that is allowed to be accessed by the terminal device includes: The mobility management network element obtains, from a data management network element, information about a network slice to which the terminal device subscribes and a DNN supported by the network slice to which the terminal device subscribes. The mobility management network element determines, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

In the foregoing clock source determining method, in a terminal registration procedure, the mobility management network element determines the information about the network slice that is allowed to be accessed by the terminal device and the DNN supported by the network slice that is allowed to be accessed by the terminal device. It should be noted that one or more DNNs may be determined herein. Then, the mobility management network element sends the determined DNN to the access network device, and the access network device determines the clock source information based on the received DNN. It should be noted that one or more pieces of clock source information may be determined herein. Then, the access network device performs the clock synchronization with the terminal device based on the clock source, so that one or more clock sources used for the clock synchronization are selected for the access network device and the terminal device. The solutions provided in this application are described above mainly from a perspective of interaction between the network elements. It may be understood that to implement the foregoing functions, each network element includes a corresponding hardware structure and/or software module for performing each function. A person skilled in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 7:
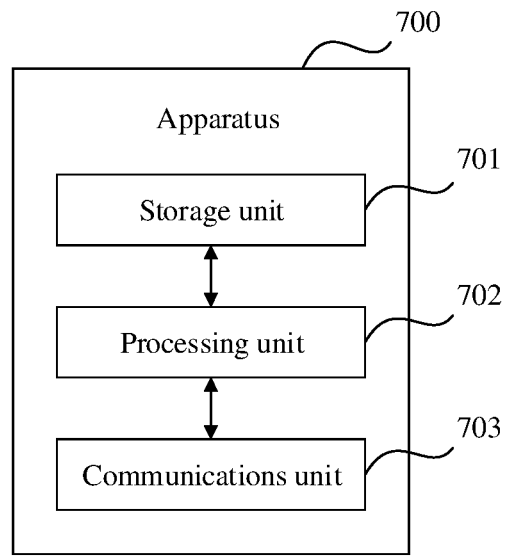
FIG. 7 is a schematic diagram of an apparatus according to this application.

When an integrated unit is used, FIG. 7 is a possible example block diagram of an apparatus according to an embodiment of the present invention. The apparatus 700 may exist in a form of software. The apparatus 700 may include a processing unit 702 and a communications unit 703. In an implementation, the communications unit 703 may include a receiving unit and a sending unit. The processing unit 702 is configured to control and manage an action of the apparatus 700. The communications unit 703 is configured to support the apparatus 700 in communicating with another network entity. The apparatus 700 may further include a storage unit 701, configured to store program code and data of the apparatus 700.

The processing unit 702 may be a processor or a controller, such as a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The controller/processor may implement or execute various example logical blocks, modules, and circuits described with reference to content disclosed in the present invention. The processor may alternatively be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a general term. During specific implementation, the communications interface may include a plurality of interfaces. The storage unit 701 may be a memory.

In an embodiment, the apparatus 700 may be an access network device, or may be a chip in an access network device. For example, the processing unit 702 is configured to support the apparatus 700 in performing step 402 and step 403 in FIG. 4, step 507 in FIG. 5, step 604 in FIG. 6, and/or another process used for the technology described in this specification. The communications unit 703 is configured to support the apparatus 700 in communicating with a mobility management network element and a terminal device. For example, the communications unit is configured to support the apparatus 700 in performing step 207 and step 208 in FIG. 2, step 304 and step 305 in FIG. 3, step 401 in FIG. 4, step 506, step 508, and step 509 in FIG. 5, and step 603, step 605, and step 606 in FIG. 6.

Specifically, when the communications unit 703 includes the sending unit and the receiving unit, the receiving unit is configured to receive information about a network slice and a data network name DNN. The processing unit is configured to: determine clock source information corresponding to both the information about the network slice and the DNN, and perform clock synchronization with the terminal device based on the clock source information.

The receiving unit may be specifically configured to receive the information about the network slice and the DNN from a session management network element. The receiving unit may be specifically configured to receive the information about the network slice and the DNN from the mobility management network element, where the information about the network slice is information about a network slice that is allowed to be accessed by the terminal device, and the DNN is a DNN supported by the network slice that is allowed to be accessed by the terminal device. The receiving unit may be further configured to receive, from a network management system, the clock source information corresponding to both the information about the network slice and the DNN.

In a possible implementation, the communications unit 703 may include a first communications subunit. The first communications subunit is configured to support the apparatus 700 in communicating with the mobility management network element. Further, the communications unit 703 may further include a second communications subunit. The second communications subunit is configured to support the apparatus 700 in communicating with the terminal device.

Figure 8:
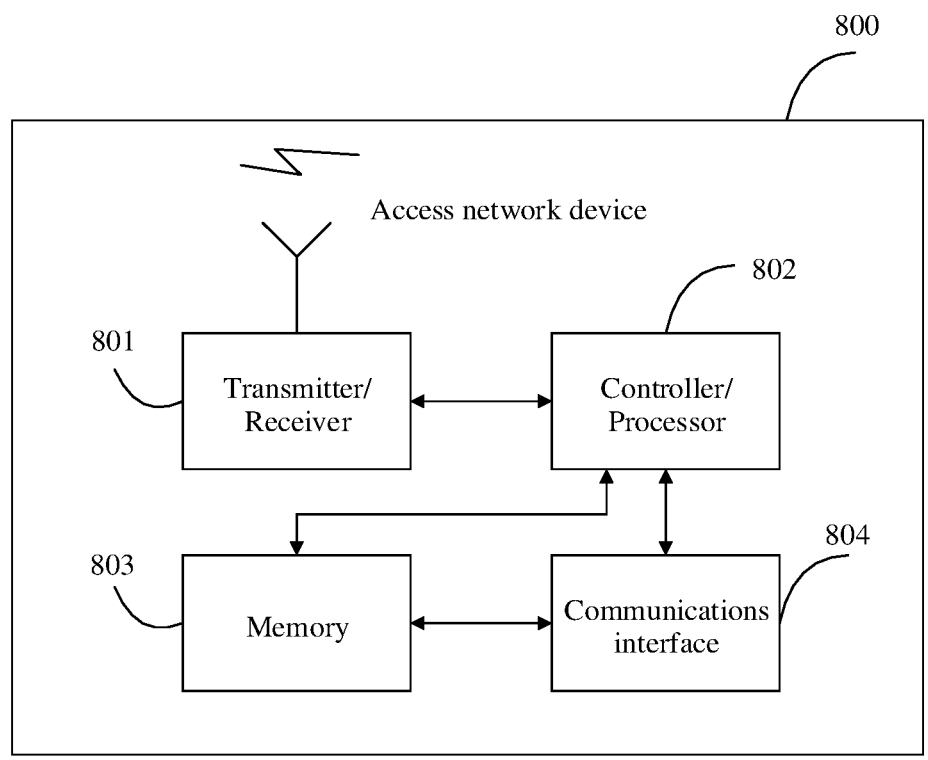
FIG. 8 is a schematic diagram of an access network device according to this application.

When the processing unit 702 is a processor, the first communications subunit may be a communications interface, the second communications subunit may be a transmitter/receiver, and the storage unit 701 is a memory, the apparatus 700 in this embodiment of the present invention may be an access network device shown in FIG. 8.

In another embodiment, the apparatus 700 shown in FIG. 7 may be a session management network element in this application.

For example, the processing unit 702 may support the apparatus 700 in performing the actions of the session management network element in the foregoing method examples. For example, the processing unit 702 is configured to support the apparatus 700 in performing step 205 in FIG. 2. The communications unit 703 may support the apparatus 700 in communicating with the mobility management network element and a data management network element. For example, the communications unit 703 is configured to support the apparatus 700 in performing step 203 and step 206 in FIG. 2 and step 503 to step 505 in FIG. 5.

When the communications unit 703 includes the sending unit and the receiving unit, the receiving unit may be configured to receive a session request from the mobility management network element, where the session request includes information about a network slice and a data network name DNN, and the session request is used to request to create a session. The processing unit may be configured to determine clock source information corresponding to both the information about the network slice and the DNN. The sending unit is configured to send the clock source information to an access network device, where the clock source information is used by the access network device to perform clock synchronization with a terminal device.

When the terminal device accesses a visited network, the session management network element may be located in the visited network.

The receiving unit may be further configured to receive, from a network management system, a correspondence among the information about the network slice, the DNN, and the clock source information; or the processing unit is further configured to obtain, from the data management network element, a correspondence among the information about the network slice, the DNN, and the clock source information.

In still another embodiment, the apparatus 700 shown in FIG. 7 may be a mobility management network element in this application.

For example, the processing unit 702 may support the apparatus 700 in performing the actions of the mobility management network element in the foregoing method examples. For example, the processing unit 702 is configured to support the apparatus 700 in performing step 202 in FIG. 2, step 302 and step 303 in FIG. 3, step 502 in FIG. 5, and/or another process used for the technology described in this specification. The communications unit 703 may support the apparatus 700 in communicating with a session management network element or an access network device. For example, the communications unit 703 is configured to support the apparatus 700 in performing step 201, step 203, step 206, and step 207 in FIG. 2, step 301 and step 304 in FIG. 3, step 501, step 503, step 505, and step 506 in FIG. 5, and step 601 and step 603 in FIG. 6.

Specifically, when the communications unit 703 includes the receiving unit and the sending unit, in an implementation, the receiving unit may be configured to receive a request message from a terminal device, where the request message is used to request to register with a network. The processing unit is configured to: determine, based on subscription information of the terminal device, information about a network slice that is allowed to be accessed by the terminal device and a data network name DNN supported by the network slice that is allowed to be accessed by the terminal device, and determine clock source information corresponding to both the information about the network slice that is allowed to be accessed by the terminal device and the DNN supported by the network slice that is allowed to be accessed by the terminal device. The sending unit is configured to send the clock source information to the access network device, where the clock source information is used by the access network device to perform clock synchronization with the terminal device.

The processing unit is specifically configured to: obtain, from a data management network element, information about a network slice to which the terminal device subscribes and a DNN supported by the network slice to which the terminal device subscribes; and determine, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

The receiving unit may be further configured to receive, from a network management system, a correspondence among the information about the network slice that is allowed to be accessed by the terminal device, the DNN supported by the network slice that is allowed to be accessed by the terminal device, and the clock source information; or the processing unit is further configured to obtain, from the data management network element, a correspondence among the information about the network slice that is allowed to be accessed by the terminal device, the DNN supported by the network slice that is allowed to be accessed by the terminal device, and the clock source information.

In another implementation, the receiving unit may be configured to receive a request message from a terminal device, where the request message is used to request to register with a network. The processing unit may be configured to determine, based on subscription information of the terminal device, information about a network slice that is allowed to be accessed by the terminal device and a data network name DNN supported by the network slice that is allowed to be accessed by the terminal device. The sending unit may be configured to send, to the access network device, the information about the network slice that is allowed to be accessed by the terminal device and the DNN supported by the network slice that is allowed to be accessed by the terminal device, where the information about the network slice that is allowed to be accessed by the terminal device and the DNN supported by the network slice that is allowed to be accessed by the terminal device are used to determine clock source information, and the clock source information may be used by the access network device to perform clock synchronization with the terminal device.

The processing unit may be specifically configured to: obtain, from a data management network element, information about a network slice to which the terminal device subscribes and a DNN supported by the network slice to which the terminal device subscribes; and determine, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device.

In still another implementation, the receiving unit may be configured to receive a request message from a terminal device, where the request message is used to request to create a session. The processing unit may be configured to determine information about a network slice and a data network name DNN. The sending unit may be configured to send a session request to the session management network element, where the session request includes the information about the network slice and the DNN, and the session request is used to request to create the session. The receiving unit is further configured to receive clock source information, from the session management network element, corresponding to both the information about the network slice and the DNN. The sending unit may be further configured to send the clock source information to the access network device, where the clock source information is used to trigger the access network device to perform clock synchronization with the terminal device.

The request message includes the information about the network slice and the DNN. The processing unit may be specifically configured to obtain the information about the network slice and the DNN from the request message; or the processing unit is specifically configured to determine the information about the network slice and the DNN based on subscription data of the terminal device, where the subscription data of the terminal device includes information about a network slice to which the terminal device subscribes and a DNN supported by the network slice to which the terminal device subscribes.

FIG. 8 is a possible schematic structural diagram of an access network device according to an embodiment of the present invention. The access network device 800 includes a processor 802 and a communications interface 804. The processor 802 may also be a controller, and is represented as the "controller/processor 802" in FIG. 8. The communications interface 804 is configured to support the access network device in communicating with another network element (for example, a mobility management network element). Further, the access network device 800 may further include a transmitter/receiver 801. The transmitter/receiver 801 is configured to support radio communication between the access network device and a terminal device in the foregoing embodiments. The processor 802 may perform various functions for communicating with the terminal device. In an uplink, an uplink signal from the terminal is received through an antenna, is demodulated (for example, a high frequency signal is demodulated into a baseband signal) by the receiver 801, and is further processed by the processor 802 to recover service data and signaling information that are sent by the terminal device. In a downlink, service data and a signaling message are processed by the processor 802, and are modulated (for example, a baseband signal is modulated into a high frequency signal) by the transmitter 801 to generate a downlink signal, and the downlink signal is transmitted to the terminal device through an antenna. It should be noted that the foregoing demodulation or modulation function may alternatively be implemented by the processor 802.

For example, the processor 802 is further configured to perform the processing processes of the access network device in the methods shown in FIG. 2 to FIG. 6 and/or another process of the technical solutions described in this application.

Further, the access network device 800 may further include a memory 803, and the memory 803 is configured to store program code and data of the access network device 800.

It may be understood that FIG. 8 shows merely a simplified design of the access network device 800. In actual application, the access network device 800 may include any quantity of transmitters, receivers, processors, controllers, memories, communications units, and the like, and all access network devices that can implement the embodiments of the present invention fall within the protection scope of the embodiments of the present invention.

Figure 9:
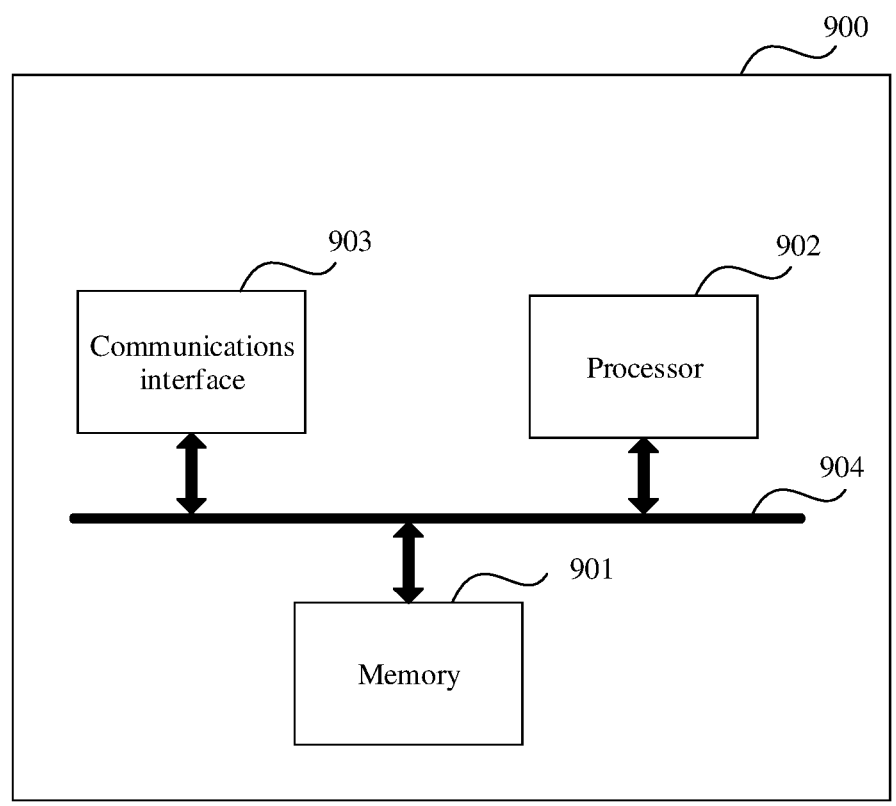
FIG. 9 is a schematic diagram of an apparatus according to this application.

FIG. 9 is a schematic diagram of an apparatus according to this application. The apparatus may be the foregoing session management network element or the foregoing mobility management network element. The apparatus 900 includes a processor 902, a communications interface 903, and a memory 901. Optionally, the apparatus 900 may further include a bus 904. The communications interface 903, the processor 902, and the memory 901 may be connected to each other by using the line of communication 904. The line of communication 904 may be a peripheral component interconnect (PCI for short) bus, an extended industry standard architecture (EISA for short) bus, or the like. The line of communication 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 is configured to communicate with another device or a communications network, such as the Ethernet, a radio access network (RAN), a wireless local area network (WLAN), or a wireline access network by using any transceiver-type apparatus.

The memory 901 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the line of communication 904. The memory may alternatively be integrated with the processor.

The memory 901 is configured to store a computer-executable instruction for executing the solutions in this application, and the processor 902 controls the execution of the computer-executable instruction. The processor 902 is configured to execute the computer-executable instruction stored in the memory 901, to implement the clock source determining method provided in the foregoing embodiments of this application.

Optionally, the computer-executable instruction in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. Optionally, the general processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor can read information from the storage medium and write information to the storage medium. Optionally, the storage medium may alternatively be integrated into the processor. The processor and the storage medium may be arranged in an ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, clearly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   receiving, by a session management network element, a session request from a mobility management network element, wherein the session request comprises information about a network slice and a data network name (DNN), and the session request requests to create a session;
   determining, by the session management network element, clock source information corresponding to both the information about the network slice and the DNN; and
   sending, by the session management network element, the clock source information to an access network device, wherein the clock source information is usable by the access network device to perform clock synchronization with a terminal device; and
   wherein the terminal device accesses a visited network, and the session management network element is located in the visited network.

2. The method according to claim 1, further comprising:
   receiving, by the session management network element from a network management system, a correspondence among the information about the network slice, the DNN, and the clock source information.

3. The method according to claim 1, further comprising:
   obtaining, by the session management network element from a data management network element, a correspondence among the information about the network slice, the DNN, and the clock source information.

4. The method according to claim 1, further comprising:
   receiving, by the access network device, the clock source information corresponding to both the information about the network slice and the DNN; and
   performing, by the access network device, clock synchronization with the terminal device based on the clock source information.

5. The method according to claim 4, further comprising:
   receiving, by the access network device, the information about the network slice and the DNN from the session management network element.

6. The method according to claim 4, further comprising:
   receiving, by the access network device, the information about the network slice and the DNN from the session management network element via the mobility management network element, wherein the information about the network slice is information about a network slice that is allowed to be accessed by the terminal device, and the DNN is supported by the network slice that is allowed to be accessed by the terminal device.

7. A system, comprising:
   a session management network element;
   a mobility management network element; and
   an access network device;
   wherein the session management network element is configured to:
      receive, from a network management system, a correspondence among information about a network slice, a data network name, and clock source information;
      receive a session request from the mobility management network element, wherein the session request comprises the information about the network slice and the DNN, and the session request requests to create a session;
      determine clock source information corresponding to both the information about the network slice and the DNN; and
      send the clock source information to the access network device; and
   wherein the access network device is configured to:
      receive the clock source information; and
      perform clock synchronization with a terminal device.

8. The system according to claim 7, wherein the terminal device accesses a visited network, and the session management network element is located in the visited network.

9. An apparatus, comprising:
   a receiver;
   a transmitter;
   a processor; and
   a non-transitory computer-readable storage medium storing a program to be executed by the processor, the program including instructions for:
      receiving a request message from a terminal device, wherein the request message requests to register with a network;
      determining, based on subscription information of the terminal device, information about a network slice that is allowed to be accessed by the terminal device and a data network name (DNN) supported by the network slice that is allowed to be accessed by the terminal device, wherein determining the information about the network slice that is allowed to be accessed by the terminal device and the DNN supported by the network slice that is allowed to be accessed by the terminal device comprises:
         obtaining, from a data management network element, information about a network slice to which the terminal device subscribes and a DNN supported by the network slice to which the terminal device subscribes; and determining, based on the information about the network slice to which the terminal device subscribes and the DNN supported by the network slice to which the terminal device subscribes, the information about the network slice that is allowed to be accessed by the terminal device and the DNN supported by the network slice that is allowed to be accessed by the terminal device;

obtaining, from the data management network element, a correspondence among the information about the network slice that is allowed to be accessed by the terminal device, the DNN supported by the network slice that is allowed to be accessed by the terminal device, and clock source information; and determining the clock source information corresponding to both the information about the network slice that is allowed to be accessed by the terminal device and the DNN supported by the network slice that is allowed to be accessed by the terminal device; and wherein the transmitter is configured to send the clock source information to an access network device, wherein the clock source information is usable by the access network device to perform clock synchronization with the terminal device.

10. The apparatus according to claim 9, wherein the request message comprises requested network slice selection assistance information.

11. The apparatus according to claim 9, wherein the request message is received in a registration procedure of the terminal device.

12. The apparatus according to claim 9, wherein the data management network element is a unified data management (UDM) network element.

13. The method according to claim 1, wherein the session request carries an identifier of the terminal device.

14. The system according to claim 7, wherein the session request carries an identifier of the terminal device.

15. The method according to claim 1, further comprising:
sending, by the session management network element, an identifier to a unified data management (UDM) network element; and
receiving, by the session management network element, subscription data from the UDM network element.

16. The system according to claim 7, wherein the session management network element is further configured to:
send an identifier to a unified data management (UDM) network element; and
receive subscription data from the UDM network element.

17. The method according to claim 1, wherein the clock source information comprises an identifier of the clock source information.

18. The system according to claim 7, wherein the clock source information comprises an identifier of the clock source information.

* * * * *